(12) United States Patent
Saita

(10) Patent No.: US 12,662,010 B2
(45) Date of Patent: Jun. 23, 2026

(54) CHARGE CONTROL SYSTEM

(71) Applicant: HONDA MOTOR CO., LTD., Tokyo (JP)

(72) Inventor: Akira Saita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 573 days.

(21) Appl. No.: 18/225,890

(22) Filed: Jul. 25, 2023

(65) Prior Publication Data

US 2024/0034175 A1 Feb. 1, 2024

(30) Foreign Application Priority Data

Jul. 27, 2022 (JP) ................................. 2022-119793

(51) Int. Cl.
*B60L 53/62* (2019.01)
*B60L 53/66* (2019.01)
*B60L 58/12* (2019.01)
*B60L 58/24* (2019.01)

(52) U.S. Cl.
CPC .............. *B60L 53/62* (2019.02); *B60L 53/66* (2019.02); *B60L 58/12* (2019.02); *B60L 58/24* (2019.02)

(58) Field of Classification Search
CPC .......... B60L 53/62; B60L 53/66; B60L 58/12; B60L 58/24
USPC ........................................................ 320/109
See application file for complete search history.

(56) References Cited

U.S. PATENT DOCUMENTS

| | | | | |
|---|---|---|---|---|
| 8,981,717 B2 * | 3/2015 | Hayashi | .................... | B60L 3/12 |
| | | | | 320/109 |
| 9,707,858 B2 * | 7/2017 | Deisler | .................. | G01C 21/26 |
| 2023/0311698 A1 * | 10/2023 | Saita | ....................... | B60L 53/66 |
| | | | | 320/109 |
| 2023/0313593 A1 * | 10/2023 | Saita | ....................... | E05F 15/70 |
| | | | | 701/49 |

FOREIGN PATENT DOCUMENTS

JP 5631470 B1 11/2014

* cited by examiner

*Primary Examiner* — Ahshik Kim

(74) *Attorney, Agent, or Firm* — Paratus Law Group, PLLC

(57) ABSTRACT

A charge control system includes a state detection unit, an electricity rate calculation unit configured to calculate, based on the charge amount, the electricity rate table, and the discharge amount, a first electricity rate with respect to a charge and discharge amount from a first time to a next vehicle use time when charge is started, and calculate a second electricity rate with respect to a charge and discharge amount from a second time to the next vehicle use time when charge is started, the first time being a time after the state detection unit detects that charge is available, the second time being different from the first time, an electricity rate comparison unit configured to compare the first electricity rate with the second electricity rate, and a notification unit configured to notify of a comparison result provided by the electricity rate comparison unit.

10 Claims, 11 Drawing Sheets

FIG. 6

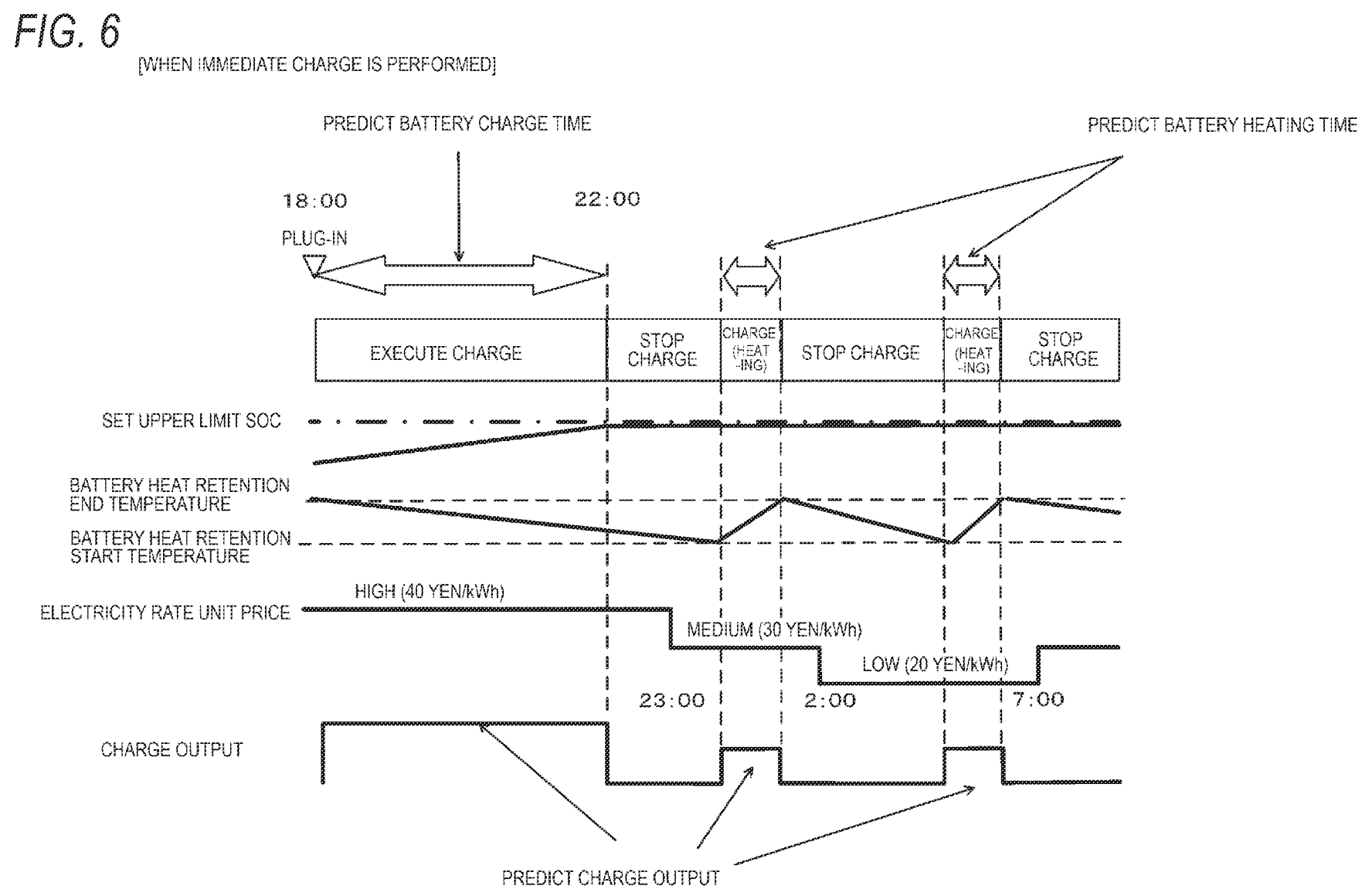

[WHEN IMMEDIATE CHARGE IS PERFORMED]

PREDICT BATTERY HEATING TIME

PREDICT BATTERY CHARGE TIME

PREDICT CHARGE OUTPUT

18:00    22:00    23:00    2:00    7:00

PLUG-IN

EXECUTE CHARGE    STOP CHARGE    CHARGE (HEAT -ING)    STOP CHARGE    CHARGE (HEAT -ING)    STOP CHARGE

SET UPPER LIMIT SOC

BATTERY HEAT RETENTION END TEMPERATURE

BATTERY HEAT RETENTION START TEMPERATURE

ELECTRICITY RATE UNIT PRICE

HIGH (40 YEN/kWh)    MEDIUM (30 YEN/kWh)    LOW (20 YEN/kWh)

CHARGE OUTPUT

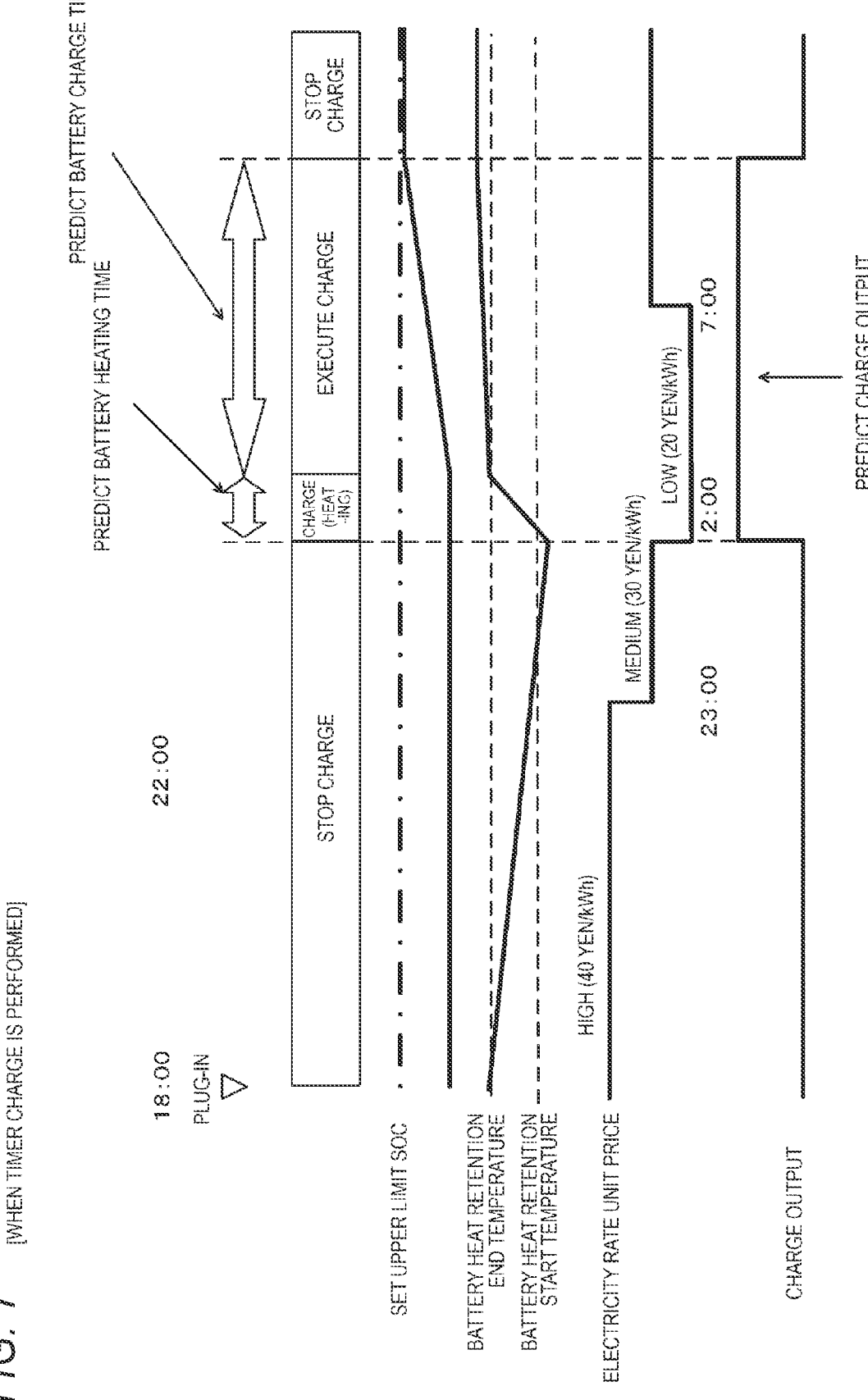
FIG. 7    [WHEN TIMER CHARGE IS PERFORMED]

CHARGE CONTROL SYSTEM

CROSS-REFERENCE TO RELATED APPLICATIONS

This application is based on and claims priority under 35 USC 119 from Japanese Patent Application No. 2022-119793 filed on Jul. 27, 2022.

TECHNICAL FIELD

The present disclosure relates to a charge control system for a battery mounted on an electric vehicle.

BACKGROUND ART

In recent years, researches and developments have been conducted on an electric vehicle which contributes to improvement in energy efficiency in order to allow more people to have access to affordable, reliable, sustainable and advanced energy.

For example, Japanese Patent No. 5631470 discloses a technique in which, regarding charge and power supply to an electric vehicle, a plurality of use-start-time candidates of a battery are displayed on a charge rate display unit of a charging device together with a charge rate corresponding to each use-start-time candidate. Specifically, a charge schedule and a charge rate corresponding to each use-start-time candidate are calculated based on a required charge time required for charging the battery from a current power storage amount to a predetermined power storage amount and a time-of-day dependent electric power rate, and are displayed on the charge rate display unit. One of the plurality of use-start-time candidates is input to a departure time input unit as a use start time. A charge control unit charges the battery with electric power supplied from an external power supply according to the input use start time.

In recent years, in order to save a charge rate, a subscription service for automatically charging in a time-of-day in which the charge rate is low is studied. Hereinafter, the subscription service may be referred to as a smart charge service. In this smart charge service, it is important to make a user aware of how much electricity rate can be saved by charging. Therefore, it is desired to improve accuracy of the electricity rate which can be saved.

When a battery is left in a high-temperature state or a low-temperature state, the battery may deteriorate and performance thereof may decrease. Therefore, there is proposed a technique of automatically adjusting a temperature of a battery such that the battery is not in a high-temperature state or a low-temperature state while a vehicle is stopped. In addition, there is proposed a technique of adjusting a temperature of a vehicle compartment to a comfortable temperature in advance according to a use time of a user. Hereinafter, this technique may be referred to as pre-air-conditioning.

In this way, when the battery temperature is adjusted or the pre-air-conditioning of the vehicle compartment is performed while the vehicle is stopped, a charge amount of the battery changes, and thus a saving effect obtained by the smart charge service may be difficult to understand.

Meanwhile, the user tends to feel bothersome in charging an electric automobile. In this regard, by saving an electricity rate by using the smart charge service or the like, it is also desired to promote an awareness modification of the user from a negative mindset of "charging is troublesome" to a positive mindset of "charging is economical" and promote a spread of electric automobiles which contribute to improvement in energy efficiency.

SUMMARY

The present disclosure provides a charge control system which improves accuracy of electricity rate information by charging. This further contributes to improvement in energy efficiency.

According to the present disclosure, there is provided a charge control system for a battery mounted on a vehicle, including a state detection unit configured to detect that the vehicle is in a chargeable state at a charging point, a charge amount calculation unit configured to calculate a charge amount which is an amount of electric power to be charged to the vehicle from a charging equipment by a time when the vehicle is used next time, an electricity rate table acquisition unit configured to acquire an electricity rate table at the charging point, a discharge amount acquisition unit configured to estimate a discharge amount which is an amount of electric power to be discharged by the time when the vehicle is used next time, an electricity rate calculation unit configured to calculate, based on the charge amount, the electricity rate table, and the discharge amount, a first electricity rate with respect to a charge and discharge amount from a first time to a next vehicle use time when charge is started, and calculate a second electricity rate with respect to a charge and discharge amount from a second time to the next vehicle use time when charge is started, the first time being a time after the state detection unit detects that charge is available, the second time being different from the first time, an electricity rate comparison unit configured to compare the first electricity rate with the second electricity rate, and a notification unit configured to notify of a comparison result provided by the electricity rate comparison unit.

According to the present disclosure, it is possible to improve accuracy of electricity rate information by charging.

BRIEF DESCRIPTION OF DRAWINGS

FIG. 6 is an explanatory diagram illustrating immediate charge.

FIG. 7 is an explanatory diagram illustrating timer charge.

DESCRIPTION OF EMBODIMENTS

Hereinafter, an embodiment of the present disclosure will be described with reference to FIGS. 1 to 11.

Figure 1:
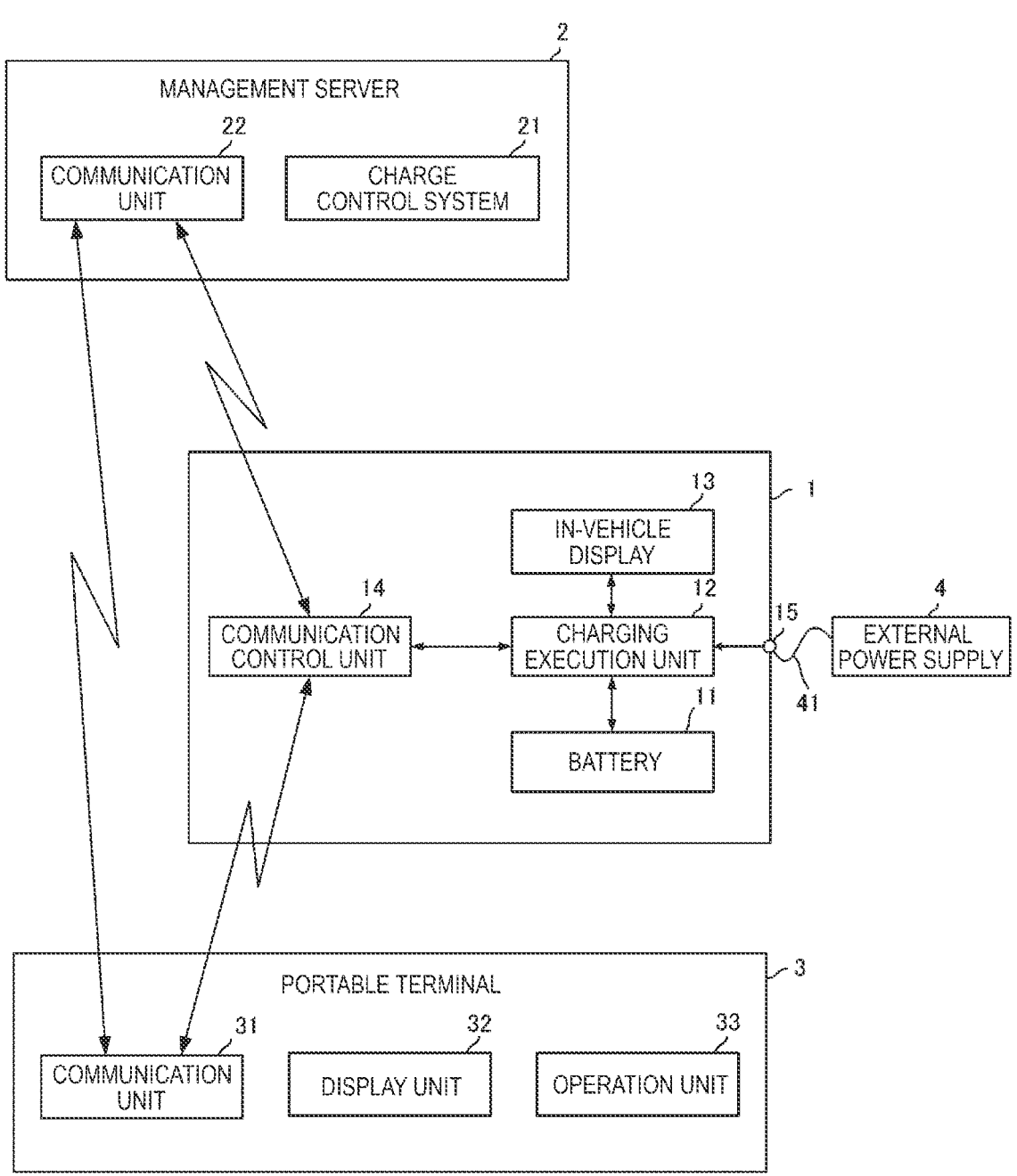
FIG. 1 illustrates a relationship between a vehicle 1 on which a battery 11 is mounted, a management server 2 constituting a charge control system 21, and a portable terminal 3 of a user.

FIG. 1 illustrates a relationship between a vehicle 1 on which a battery 11 is mounted, a management server 2 constituting a charge control system 21, and a portable terminal 3 of a user. The charge control system 21 is installed on the management server 2 in the present embodiment, the charge control system 21 may also be installed on the vehicle 1 or the portable terminal 3, or may be separately installed on the vehicle 1, the management server 2, and the portable terminal 3.

In the present embodiment, the vehicle may be any vehicle as long as the vehicle is movable by electric power supply from the battery. Therefore, the present embodiment can be applied to various vehicles such as two-wheeled, three-wheeled, and four-wheeled vehicles. The vehicles include an electric vehicle which travels by electric power supply from a battery and a hybrid vehicle including a motor which is driven upon receiving electric power supply from a battery and an internal combustion engine.

As illustrated in FIG. 1, the vehicle 1 includes the battery 11, a charging execution unit 12, an in-vehicle display 13, a communication control unit 14, and a charging port 15. An external power supply 4 is, for example, charging equipment provided in a property of home of a user of the vehicle 1. The external power supply 4 may also be located in a place other than the property of home and is limited to charging equipment which is registered in advance and located at a location where smart charge can be performed (basic charging location). When the vehicle 1 is on the property of home, the user inserts a charging gun (charging connector) provided at a tip end of a cable 41 extending from the external power supply 4 into the charging port 15, thereby allowing the battery 11 to be charged by power from the external power supply 4. In the present embodiment, a case where the battery 11 is charged by power from the external power supply 4 by a plug-in method will be described, and the battery 11 may also be charged by power from the external power supply 4 by a non-contact power supply method.

When the charging connector is connected to the charging port 15, the charging execution unit 12 executes charge of the battery 11 by power from the external power supply 4 under control of the management server 2. In addition, the charging execution unit 12 can acquire various types of information related to the vehicle 1 including the battery 11 (for example, a state of charge (SOC) which is a remaining capacity of the battery 11, a temperature of the battery 11 (hereinafter, referred to as a battery temperature), an outside air temperature of the vehicle 1, and the like) using various sensors.

The in-vehicle display 13 is a navigation device or the like provided in the vehicle 1. Therefore, the in-vehicle display 13 can display various types of information as images and output the information as voice. In addition, the in-vehicle display 13 includes an operation unit such as a touch panel which receives an operation input from the user.

The communication control unit 14 can transmit and receive information to and from the management server 2 and the portable terminal 3 by wireless communication. The communication control unit 14, for example, receives an instruction content related to charge control for the battery 11 from the management server 2 and outputs the instruction content to the charging execution unit 12, and transmits various types of information related to the battery 11 acquired by the charging execution unit 12 to the management server 2.

Figure 2:
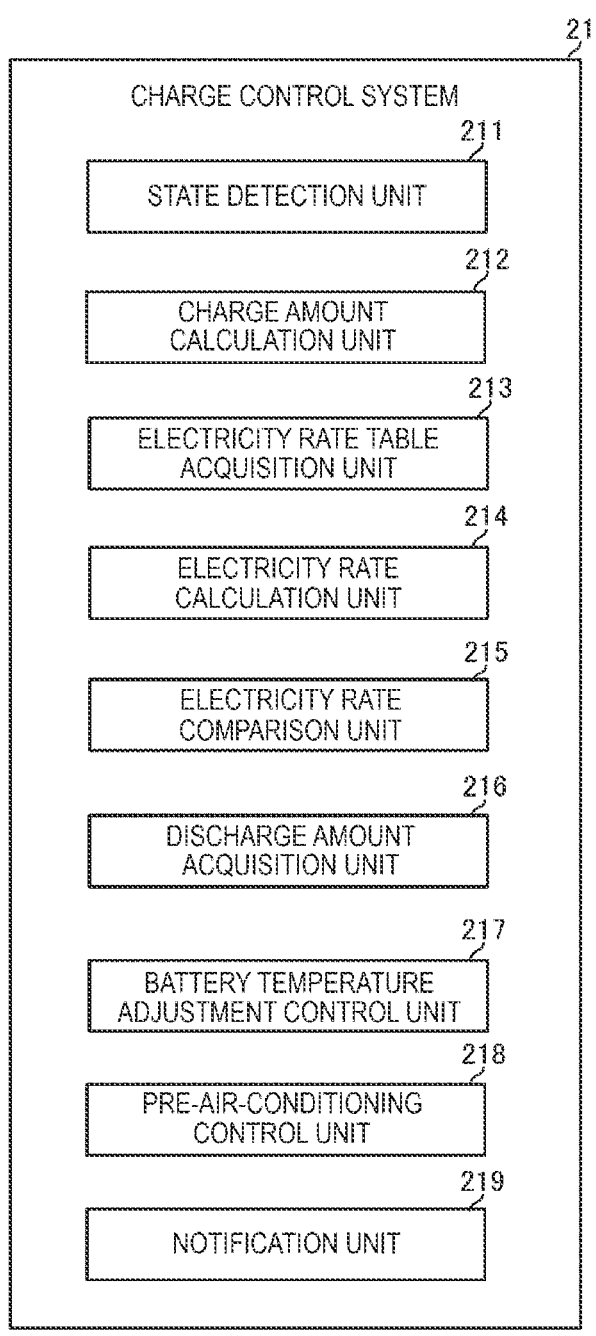
FIG. 2 is a block diagram illustrating the charge control system 21.

The management server 2 includes the charge control system 21 and a communication unit 22. The charge control system 21 includes hardware including a control processor such as a CPU and a storage device such as a ROM, a RAM, and a storage, and software such as a charge control program stored in the ROM or the storage. As illustrated in FIG. 2, the charge control system 21 includes, as functional configurations implemented by cooperation between hardware and software, a state detection unit 211, a charge amount calculation unit 212, an electricity rate table acquisition unit 213, an electricity rate calculation unit 214, an electricity rate comparison unit 215, a discharge amount acquisition unit 216, a battery temperature adjustment control unit 217, a pre-air-conditioning control unit 218, and a notification unit 219. The functional configurations will be described later.

The communication unit 22 can transmit and receive information to and from the communication control unit 14 of the vehicle 1 and the portable terminal 3 by wireless communication. The communication unit 22 receives, from the communication control unit 14, for example, various types of information related to the vehicle 1 (for example, the SOC and the battery temperature of the battery 11 and the outside air temperature of the vehicle 1).

The portable terminal 3 is, for example, a smart device such as a smartphone, and includes a communication unit 31, a display unit 32, and an operation unit 33. The communication unit 31 can transmit and receive information to and from the communication unit 22 of the management server 2 and the communication control unit 14 of the vehicle 1 by wireless communication. The display unit 32 displays various types of information as images. The operation unit 33 is a touch panel or the like which receives an operation input from the user.

Next, the functional configurations of the charge control system 21 will be described.

The state detection unit 211 detects that the vehicle 1 is in a chargeable state at a charging point. For example, the state detection unit 211 detects a state in which the charging gun is inserted into the charging port 15 of the vehicle 1 and determines whether the vehicle 1 is in a chargeable state.

The charge amount calculation unit 212 calculates a charge amount (a charge output and a charge time) which is an amount of electric power to be charged by a time when the vehicle 1 is used next time. For example, the charge amount calculation unit 212 predicts, based on a current SOC, a charge amount until the battery 11 reaches a set upper limit SOC. The set upper limit SOC is a target SOC at the time of charge which may be a fully-charged state, and is preferably set as desired by the user, for example, set to 80%. In addition, the charge amount calculation unit 212 calculates the charge amount in consideration of a discharge amount which is an amount of electric power to be discharged by the time when the vehicle 1 is used next time. The charge amount calculation unit 212 calculates an electric power amount for compensating for the discharge amount and adds the electric power amount to the charge amount. The discharge amount will be described later.

The electricity rate table acquisition unit 213 acquires an electricity rate table at the charging point. For example, the electricity rate table acquisition unit 213 stores electricity rate tables related to various electricity rate plans provided by a plurality of electric power companies, and acquires an electricity rate table corresponding to the charging point from the electricity rate tables. The electricity rate table includes information on a plurality of times-of-day and information on an electricity rate unit price in each time-of-day. For example, as illustrated in FIGS. 6 and 7, the electricity rate table includes information indicating that the electricity rate unit price is 40 yen/kWh in a time-of-day of 11:00 to 23:00, the electricity rate unit price is 30 yen/kWh in a time-of-day of 23:00 to 2:00 and in a time-of-day of 7:00 to 11:00, and the electricity rate unit price is 20 yen/kWh in a time-of-day of 2:00 to 7:00.

The discharge amount acquisition unit 216 estimates the discharge amount which is the amount of electric power to be discharged from the battery 11 by the time when the vehicle 1 is used next time. For example, the discharge amount includes an amount of electric power consumed to adjust the temperature of the battery 11 while the vehicle is stopped and an amount of electric power consumed to adjust a temperature of a vehicle compartment while the vehicle is stopped. The discharge amount can be estimated based on history information of the battery temperature adjustment control unit 217 and the pre-air-conditioning control unit 218 or the like. The discharge amount acquired by the discharge amount acquisition unit 216 is typically a discharge amount at a time after charge is performed to reach the set upper limit SOC. However, when temperature adjustment control by the battery temperature adjustment control unit 217 is performed before the charge to the set upper limit SOC, the discharge amount at a time before the charge to the set upper limit SOC is contained.

Figure 4:
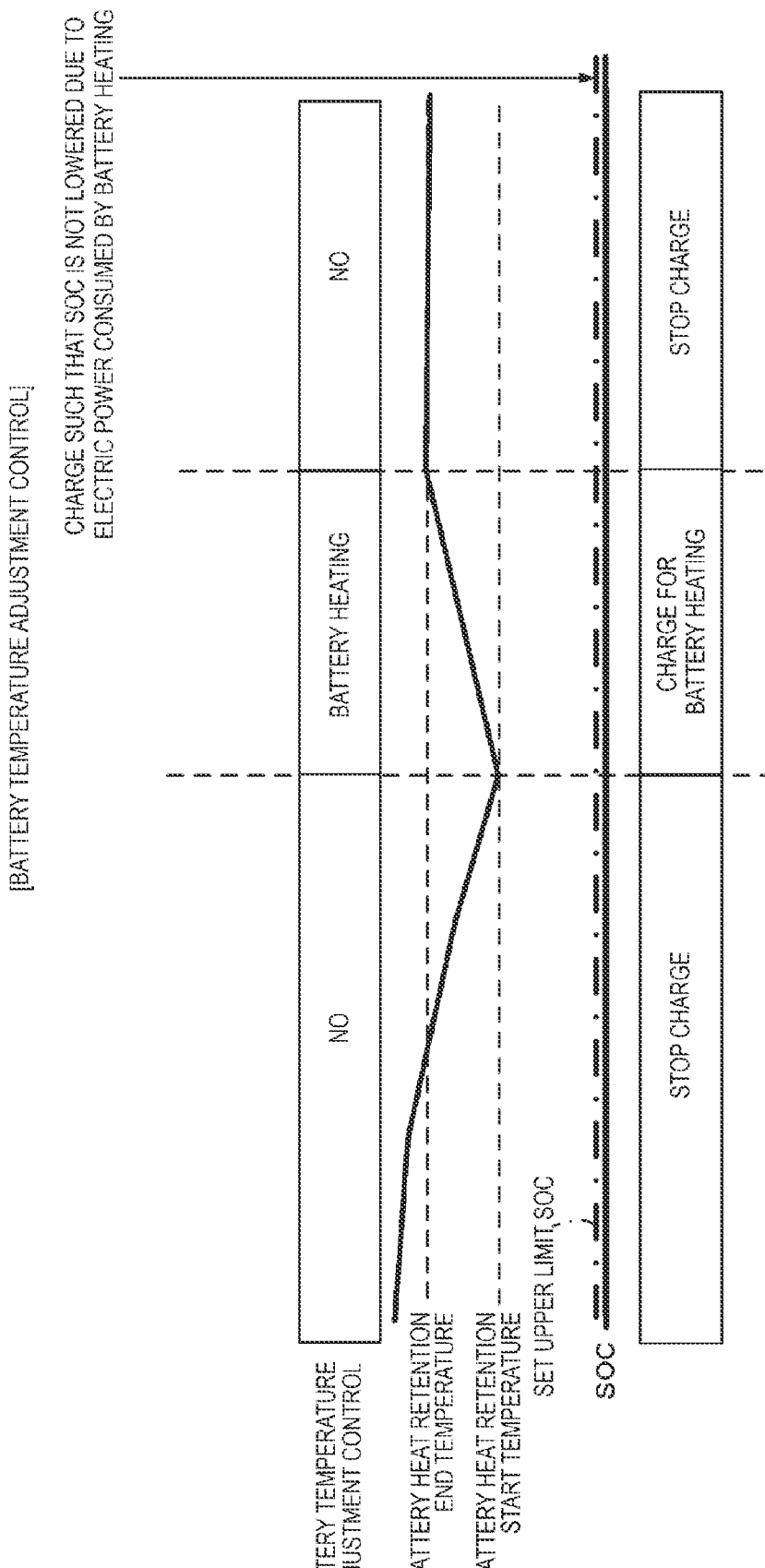
FIG. 4 is an explanatory diagram illustrating battery temperature adjustment control.

The battery temperature adjustment control unit 217 predicts a temperature transition of the battery 11 and adjusts the temperature of the battery 11 while the vehicle is stopped based on the temperature transition of the battery 11. For example, as illustrated in FIG. 4, when the temperature of the battery 11 falls below a preset battery heat retention start temperature, the battery 11 is heated until the battery temperature reaches a battery heat retention end temperature which is set to a temperature higher than the battery heat retention start temperature. At this time, when the vehicle 1 is in a chargeable state, charge is executed such that the SOC does not decrease. The discharge amount acquisition unit 216 estimates an amount of electric power consumed at this time as a first discharge amount.

Figure 5:
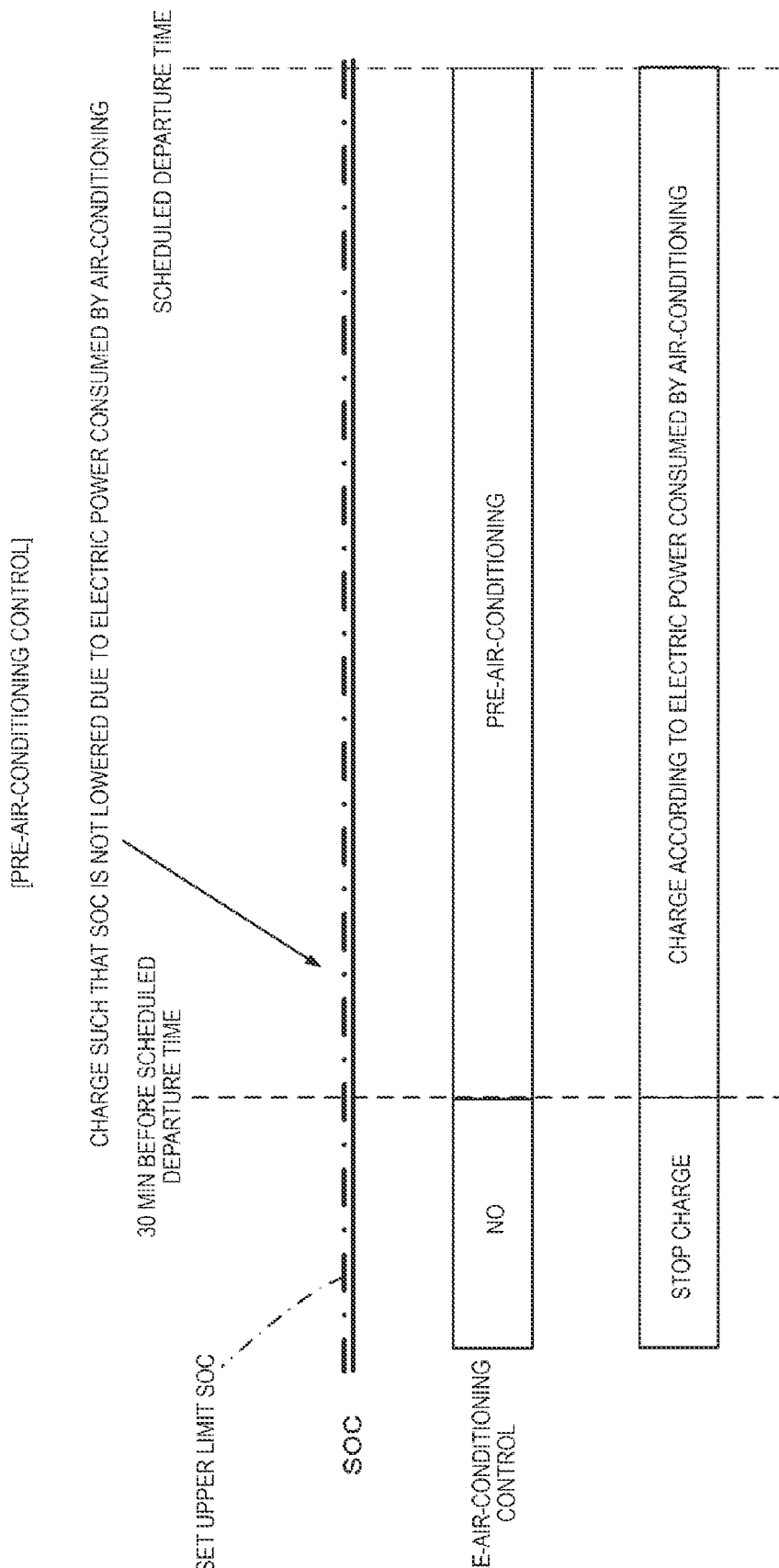
FIG. 5 is an explanatory diagram illustrating pre-air-conditioning.

The pre-air-conditioning control unit 218 adjusts, based on a next scheduled use time, the temperature of the vehicle compartment while the vehicle is stopped. For example, when the user sets pre-air-conditioning, as illustrated in FIG. 5, the pre-air-conditioning control unit 218 executes air-conditioning of the vehicle compartment 30 minutes before a scheduled departure time and adjusts the temperature of the vehicle compartment to a set temperature at the scheduled departure time. At this time, when the vehicle 1 is in a chargeable state, charge is executed such that the SOC does not decrease. The discharge amount acquisition unit 216 estimates an amount of electric power consumed at this time as a second discharge amount.

The electricity rate calculation unit 214 calculates, based on the charge amount calculated by the charge amount calculation unit 212, the electricity rate table acquired by the electricity rate table acquisition unit 213, and the discharge amount estimated by the discharge amount acquisition unit 216, a first electricity rate with respect to a charge and discharge amount from a first time which is a time after the state detection unit 211 detects that charge is available to a next vehicle use time when charge is started, and calculates a second electricity rate with respect to a charge and discharge amount from a second time different from the first time to the next vehicle use time when charge is started. For example, the first time is a time when the vehicle 1 is in a chargeable state, and the second time is a time selected based on the electricity rate table and the charge amount such that the second electricity rate is minimized Hereinafter, charge starting from the first time may be referred to as "immediate charge", and charge starting from the second time may be referred to as "timer charge". The timer charge is an aspect of the smart charge service described above.

The electricity rate comparison unit 215 compares the first electricity rate with the second electricity rate. For example, the electricity rate comparison unit 215 calculates a difference between the first electricity rate and the second electricity rate.

The notification unit 219 notifies the user of a comparison result between the first electricity rate and the second electricity rate compared by the electricity rate comparison unit 215. For example, the portable terminal 3 of the user is notified of a comparison result between an electricity rate when the immediate charge is performed as illustrated in FIG. 6 and an electricity rate when the timer charge is performed as illustrated in FIG. 7.

Specifically, the electricity rate when the immediate charge is performed as illustrated in FIG. 6 includes an electricity rate (yen) obtained by multiplying a charge output (kW) and a charge time (h) required for charging to the set upper limit SOC from immediately after returning home by an electricity rate unit price (yen/kWh) in such a time-of-day, and an electricity rate (yen) obtained by multiplying a charge output (kW) and a charge time (h) required for charging together with battery temperature adjustment control (heating) by the electricity rate unit price (yen/kWh) in this time-of-day.

The electricity rate when the timer charge is performed as illustrated in FIG. 7 includes an electricity rate (yen) obtained by multiplying a charge output (kW) and a charge time (h) required for charging to the set upper limit SOC from a time-of-day in which an electricity rate unit price is low by the electricity rate unit price (yen/kWh) of the time-of-day, and an electricity rate (yen) obtained by multiplying a charge output (kW) and a charge time (h) required for charging together with battery temperature adjustment control (heating) by the electricity rate unit price (yen/kWh) in this time-of-day. That is, each electricity rate in FIGS. 6 and 7 is calculated by predicting a time-series change in the charge output based on an SOC when charge is started, an SOC when charge is ended, an output of the charging equipment, and prediction on the temperature transition of the battery, and multiplying the charge output and the charge time by the electricity rate unit price.

Figure 3:
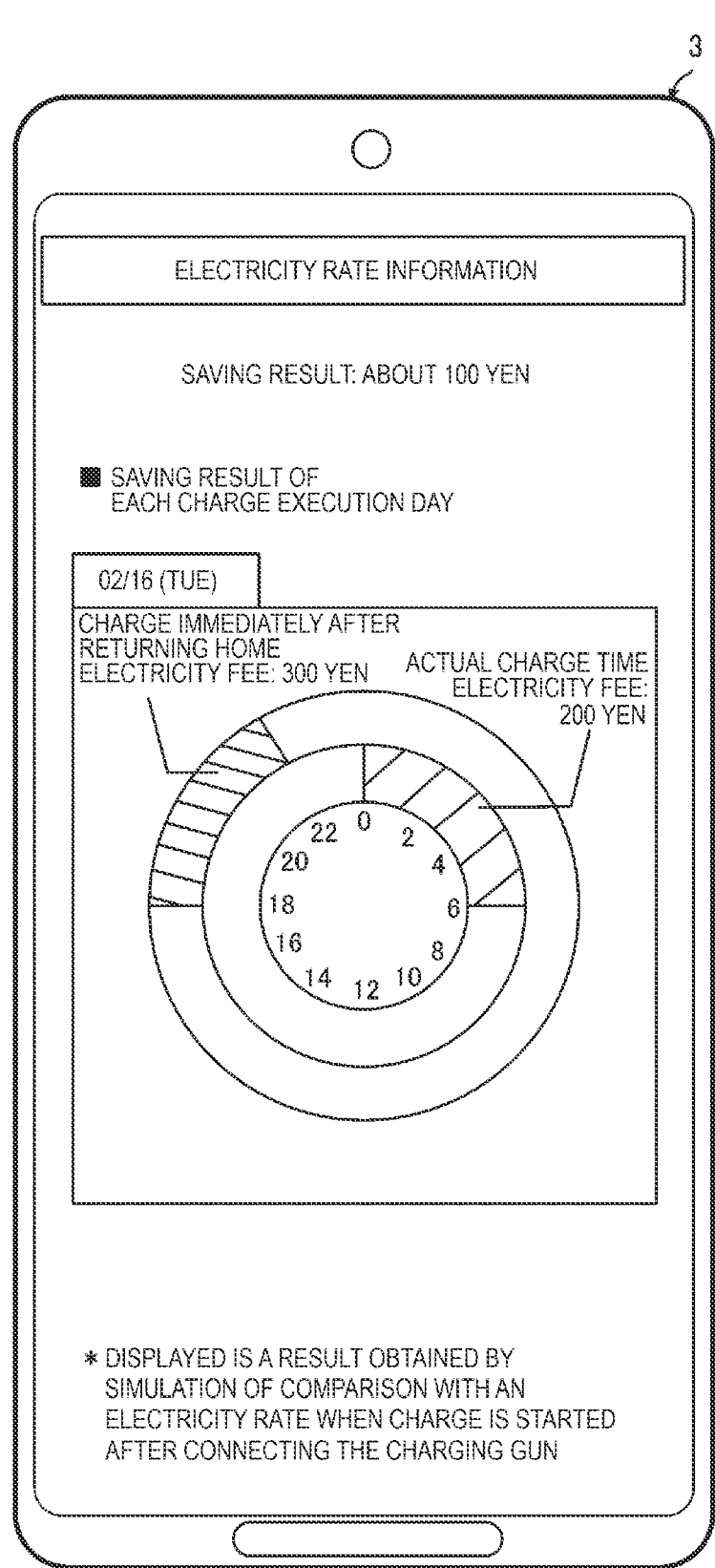
FIG. 3 illustrates electricity rate information displayed on the portable terminal 3 of the user along with battery charge.

When the user sets pre-air-conditioning, each electricity rate illustrated in FIGS. 6 and 3 also includes the electricity rate obtained by multiplying the charge output and the charge time required for the pre-air-conditioning by the electricity rate unit price in the time-of-day.

Then, as illustrated in FIG. 3, the notification unit 219 notifies the portable terminal 3 of the user of the first electricity rate (for example, 300 yen) which is an electricity fee when the immediate charge is performed, the second electricity rate (for example, 200 yen) which is an electricity fee when the timer charge is performed, and a saving result (for example, 100 yen) which is a difference between the first electricity rate and the second electricity rate. Accordingly, the user can accurately know a saving effect obtained when the charge time is changed by the timer charge. A destination of the notification is not limited to the portable terminal 3 and may be the in-vehicle display 13, a smart device at home, or the like. In addition, instead of the difference between the first electricity rate and the second electricity rate, a reduction ratio of the second electricity rate to the first electricity rate may be notified of.

Figure 8:
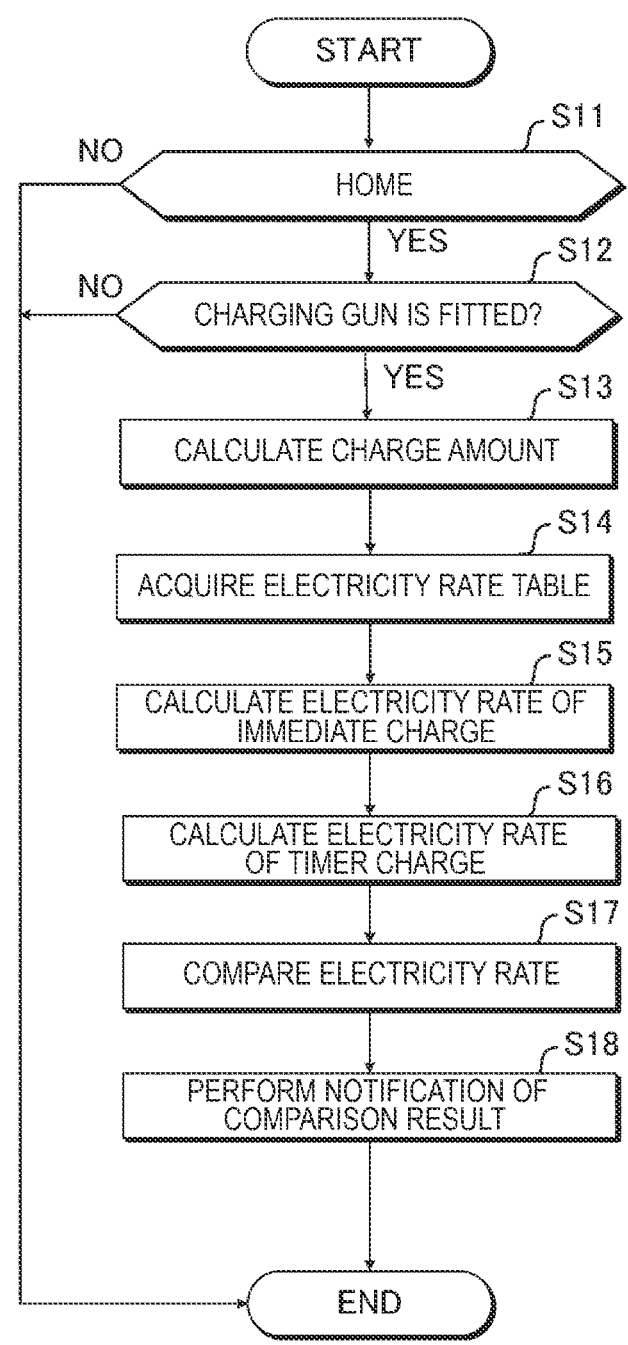
FIG. 8 is a flowchart illustrating notification processing of an electricity rate comparison result.
Figure 9:
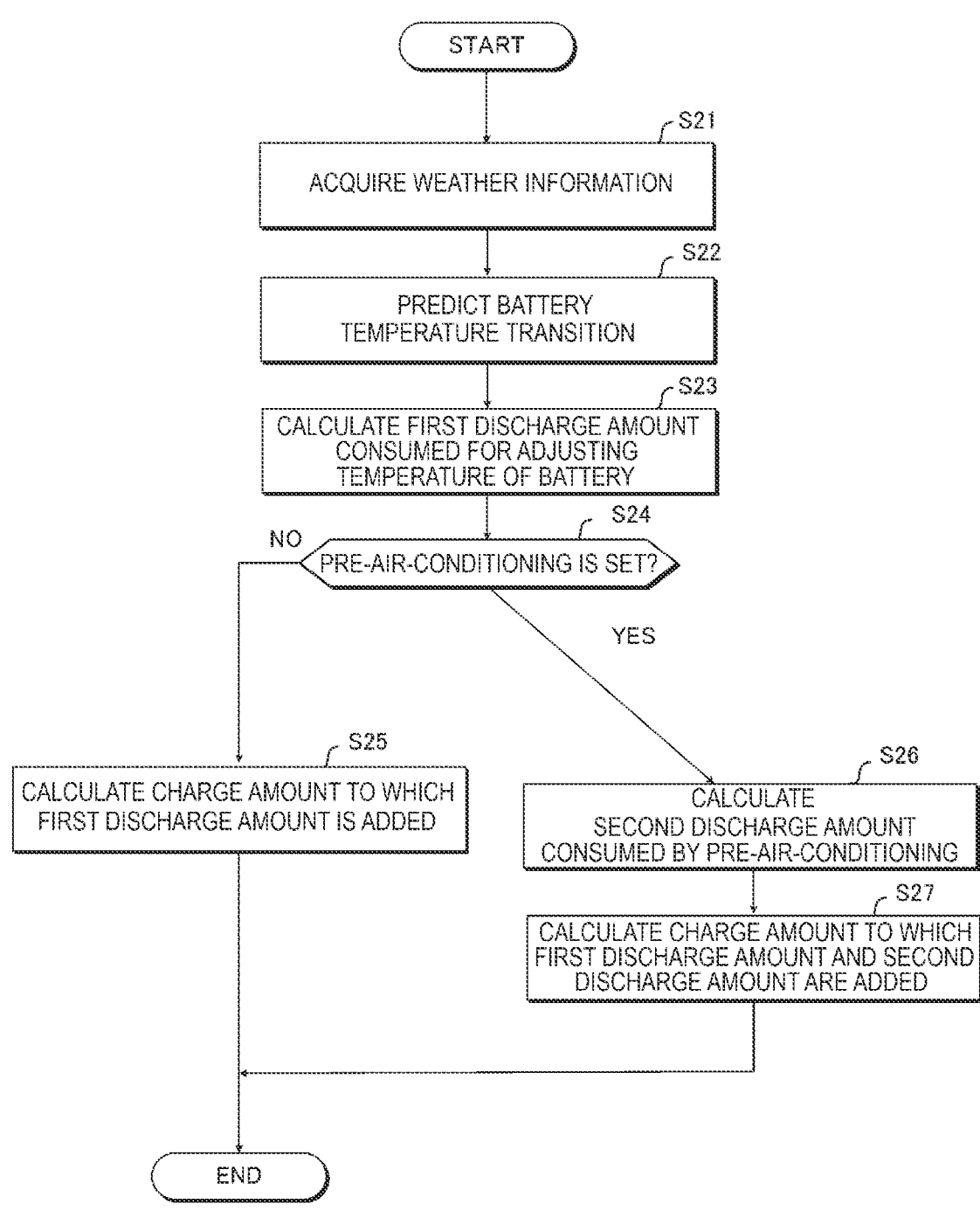
FIG. 9 is a flowchart illustrating charge amount calculation processing.

Next, a processing procedure of the charge control system 21 will be described with reference to FIGS. 8 and 9. FIG. 8 is a flowchart illustrating notification processing of the electricity rate comparison result. FIG. 9 is a flowchart illustrating charge amount calculation processing.

As illustrated in FIG. 8, in the notification processing of the electricity rate comparison result, the charge control system 21 determines whether a position of the vehicle 1 is at home (charging point) (S11), determines whether the charging gun is fitted in the charging port 15 (S12), and ends the processing when any one determination result thereof is NO. When the determination results of step S11 and step S12 are both YES, the charge control system 21 calculates the charge amount which is an amount of electric power to be charged by the time when the vehicle 1 is used next time (S13). Details of the charge amount calculation processing will be described later.

Next, after acquiring the electricity rate table applied to the home (charging point) (S14), the charge control system 21 calculates the electricity rate of the immediate charge (S15) and calculates the electricity rate of the timer charge (S16). Thereafter, the charge control system 21 calculates a difference between the electricity rate of the immediate charge and the electricity rate of the timer charge as electricity rate comparison processing (S17) and notifies the portable terminal 3 of the user of the difference (S18). The notification of the electricity rate comparison result may be a notification before charge, a notification after charge, or a notification at a predetermined time. As an example, the notification unit 219 performs notification of the electricity rate comparison result at a timing when connection of the charging gun to the vehicle 1 is detected at the basic charging location registered in advance.

As illustrated in FIG. 9, in the charge amount calculation processing, the charge control system 21 acquires weather information at the home (charging point) (S21), then predicts the temperature transition of the battery 11 (S22), and calculates the first discharge amount consumed by the temperature adjustment of the battery 11 by the time when the vehicle 1 is used next time (S23). Thereafter, the charge control system 21 determines whether pre-air-conditioning is set (S24), when a result of the determination is NO, the charge control system 21 calculates the charge amount to which the first discharge amount is added and ends the processing (S25). In addition, when it is determined that the pre-air-conditioning is set (YES in S24), the charge control system 21 calculates the second discharge amount consumed by the pre-air-conditioning (S26), calculates the charge amount to which the first discharge amount and the second discharge amount are added and ends the processing (S27).

Next, a modification of the charge control system 21 will be described with reference to FIGS. 10 and 11. However, the same reference numerals as those in the above-described embodiment are used for the same configurations as those in the above-described embodiment, and the description of the above-described embodiment is incorporated.

Figure 10:
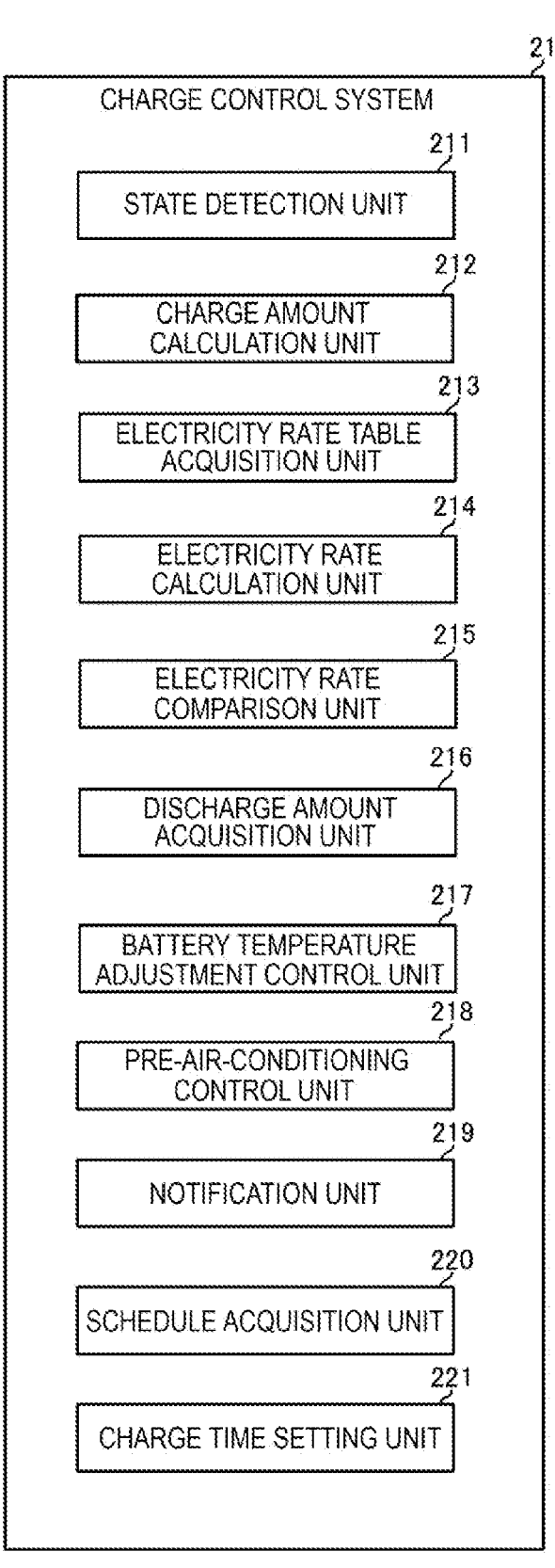
FIG. 10 is a block diagram illustrating the charge control system 21 according to a modification.

As illustrated in FIG. 10, the charge control system 21 according to the modification includes a schedule acquisition unit 220 and a charge time setting unit 221 as functional configurations.

The schedule acquisition unit 220 acquires a schedule of the user. For example, the schedule of the user includes a time when the vehicle 1 is scheduled to be used next time.

The charge time setting unit 221 sets the second time based on the schedule of the user and the electricity rate table. The charge time setting unit 221 sets, as the second time, for example, a time when the electricity rate is lowest as a first priority, and sets the time if the time is available for charging with reference to the schedule of the user. On the other hand, if the time is unavailable for charging with reference to the schedule of the user, a next time when the electricity rate becomes low is set. According to the charge control system 21 according to the modification, it is possible to set an optimum charge time according to the schedule of the user. The second time may also be manually set by the user.

Figure 11:
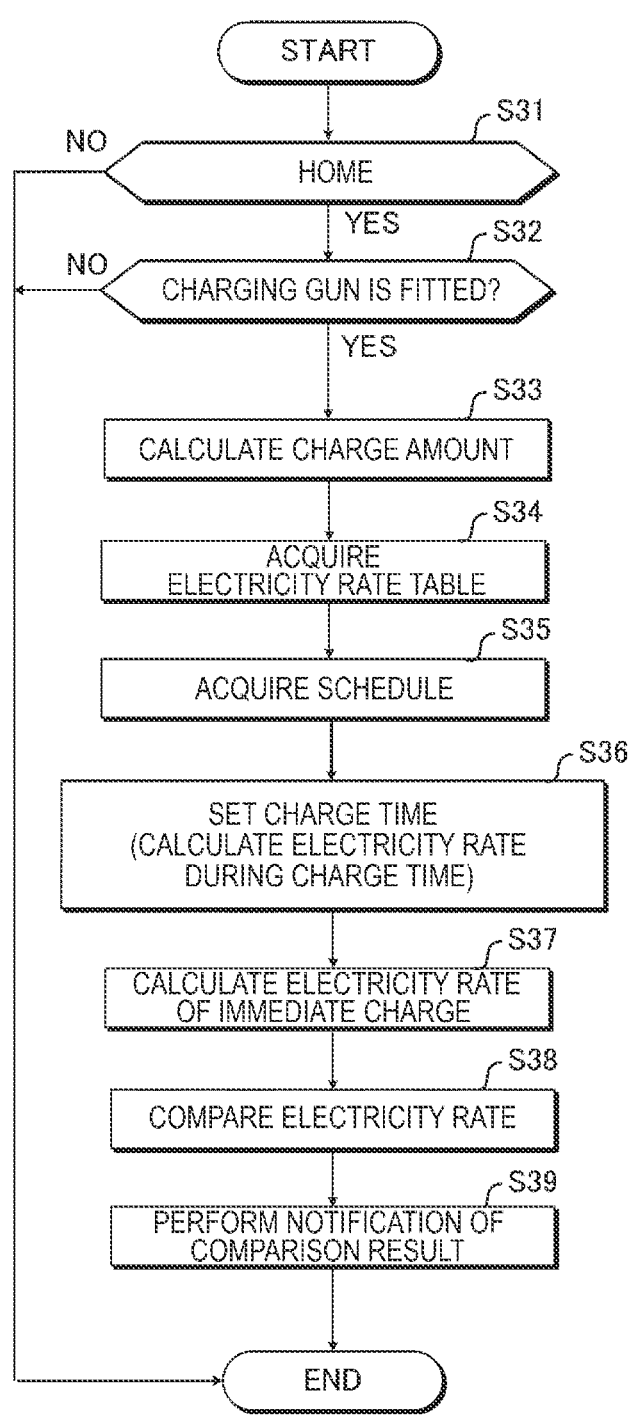
FIG. 11 is a flowchart illustrating notification processing of an electricity rate comparison result according to the modification.

As illustrated in FIG. 11, in the notification processing of the electricity rate comparison result, the charge control system 21 according to the modification determines whether the position of the vehicle 1 is at home (charging point) (S31), determines whether the charging gun is fitted in the charging port 15 (S32), and ends the processing when any one determination result thereof is NO. When the determination results of step S31 and step S32 are both YES, the charge control system 21 calculates the charge amount which is an amount of electric power to be charged by the time when the vehicle 1 is used next time (S33).

Next, the charge control system 21 acquires the electricity rate table applied to the home (charging point) (S34) and acquires the schedule of the user (S35). In addition, the charge control system 21 sets a time of the timer charge based on the schedule of the user and the electricity rate table, calculates the electricity rate of the timer charge (S36), and calculates the electricity rate of the immediate charge (S37). Thereafter, the charge control system 21 calculates a difference between the electricity rate of the immediate charge and the electricity rate of the timer charge as electricity rate comparison processing (S38) and notifies the portable terminal 3 of the user of the difference (S39).

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiments may be freely combined without departing from the gist of the invention.

In the present specification, at least the following matters are described. Although corresponding constituent elements or the like in the above-described embodiments are shown in parentheses, the present invention is not limited thereto.

(1) A charge control system (charge control system 21) for a battery (battery 11) mounted on a vehicle (vehicle 1), including:

a state detection unit (state detection unit 211) configured to detect that the vehicle is in a chargeable state at a charging point;

a charge amount calculation unit (charge amount calculation unit 212) configured to calculate a charge amount which is an amount of electric power to be charged to the vehicle from charging equipment by a time when the vehicle is used next time;

an electricity rate table acquisition unit (electricity rate table acquisition unit 213) configured to acquire an electricity rate table at the charging point;

a discharge amount acquisition unit (discharge amount acquisition unit 216) configured to estimate a discharge amount which is an amount of electric power to be discharged by the time when the vehicle is used next time;

an electricity rate calculation unit (electricity rate calculation unit 214) configured to calculate, based on the charge amount, the electricity rate table, and the discharge amount, a first electricity rate with respect to a charge and discharge amount from a first time to a next vehicle use time when charge is started, and calculate a second electricity rate with respect to a charge and discharge amount from a second time to the next vehicle use time when charge is started, the first time being a time after the state detection unit detects that charge is available, the second time being different from the first time;

an electricity rate comparison unit (electricity rate comparison unit 215) configured to compare the first electricity rate with the second electricity rate; and a notification unit (notification unit 219) configured to notify of a comparison result provided by the electricity rate comparison unit.

According to (1), the electricity rate is calculated in consideration of the discharge amount which is the amount of electric power to be discharged by the time when the vehicle is used next time, and the user is notified of the comparison result of the electricity rate. Therefore, accuracy of electricity rate information is improved. Accordingly, the user can more accurately know a saving effect obtained when the charge time is changed. In addition, energy efficiency can be expected to be improved by charging in a time period in which electricity use is less.

(2) The charge control system according to (1), in which the notification unit notifies of a difference between the second electricity rate and the first electricity rate or a reduction ratio of the second electricity rate to the first electricity rate.

According to (2), the user can easily understand the saving effect obtained when the charge time is changed.

(3) The charge control system according to (1) or (2), in which the first time is a time when the vehicle is in a chargeable state.

According to (3), it is possible to compare the saving effect with a case where charge is performed immediately after connecting a charging plug, for example.

(4) The charge control system according to any one of (1) to (3), in which the second time is settable by a user.

According to (4), a charge start time can be set according to preference of the user, and the user can know the saving effect obtained when charge is started at that time.

(5) The charge control system according to any one of (1) to (3), further including:

a schedule acquisition unit (schedule acquisition unit 220) configured to acquire a schedule of a user; and a charge time setting unit (charge time setting unit 221) configured to set the second time based on the schedule and the electricity rate table.

According to (5), an optimum charge start time is set based on the schedule of the user and the electricity rate table, thereby improving convenience of a smart charge service.

(6) The charge control system according to any one of (1) to (5), further including:

a battery temperature prediction unit (battery temperature adjustment control unit 217) configured to predict a temperature transition of the battery; and a battery temperature adjustment control unit (battery temperature adjustment control unit 217) configured to adjust, based on the temperature transition of the battery, a temperature of the battery while the vehicle is stopped, in which the discharge amount includes an amount of electric power consumed to adjust the temperature of the battery.

According to (6), deterioration of the battery is reduced. In addition, accuracy of electricity rate information is improved since the discharge amount includes the electric power amount associated with this control.

(7) The charge control system according to any one of (1) to (6), further including:

a vehicle compartment temperature adjustment control unit (pre-air-conditioning control unit 218) configured to adjust, based on a next scheduled use time, a temperature of a vehicle compartment while the vehicle is stopped, in which the discharge amount includes an amount of electric power consumed to adjust the temperature of the vehicle compartment.

According to (7), comfort in the vehicle is improved since the vehicle compartment is kept at an appropriate temperature when the user uses the vehicle. In addition, accuracy of electricity rate information is improved since the discharge amount includes the electric power amount associated with this control.

(8) The charge control system according to any one of (1) to (7), in which the discharge amount acquisition unit acquires a discharge amount at a time after charge to a target SOC is performed.

According to (8), the accuracy of the electricity rate information is improved since the electricity rate is calculated based on the discharge amount at the time after the charge to the target SOC is performed.

(9) The charge control system according to any one of (1) to (8), in which the electricity rate calculation unit predicts a time-series change in a charge output based on an SOC at a start of charge, an SOC at an end of charge, an output of the charging equipment, and a battery temperature transition prediction, and calculates the electricity rate by multiplying a charge output and a charge time by an electricity rate unit price.

According to (9), by calculating the electricity rate by multiplying the charge output by the electricity rate unit price, the electricity rate can be easily calculated. The accuracy of the information is improved.

(10) The charge control system according to any one of (1) to (9), in which the notification unit notifies of the comparison result at a timing when it is detected that a charging unit (charging gun) is connected to the vehicle at a basic charging location registered in advance.

According to (10), it is possible to notify the user of the saving effect obtained by the timer charge at a timing when the user is highly aware of charge.

What is claimed is:

1. A charge control system for a battery mounted on a vehicle, comprising:

a state detection unit configured to detect that the vehicle is in a chargeable state at a charging point;

a charge amount calculation unit configured to calculate a charge amount which is an amount of electric power to be charged to the vehicle from a charging equipment by a time when the vehicle is used next time;

an electricity rate table acquisition unit configured to acquire an electricity rate table at the charging point;

a discharge amount acquisition unit configured to estimate a discharge amount which is an amount of electric power to be discharged by the time when the vehicle is used next time;

an electricity rate calculation unit configured to calculate, based on the charge amount, the electricity rate table, and the discharge amount, a first electricity rate with respect to a charge and discharge amount from a first time to a next vehicle use time when charge is started, and calculate a second electricity rate with respect to a charge and discharge amount from a second time to the next vehicle use time when charge is started, the first time being a time after the state detection unit detects that charge is available, the second time being different from the first time;

an electricity rate comparison unit configured to compare the first electricity rate with the second electricity rate; and a notification unit configured to notify of a comparison result provided by the electricity rate comparison unit.

2. The charge control system according to claim 1, wherein the notification unit notifies of a difference between the second electricity rate and the first electricity rate or a reduction ratio of the second electricity rate to the first electricity rate.

3. The charge control system according to claim 1, wherein the first time is a time when the vehicle is in a chargeable state.

4. The charge control system according to claim 1, wherein the second time is settable by a user.

5. The charge control system according to claim 1, further comprising:

a schedule acquisition unit configured to acquire a schedule of a user; and a charge time setting unit configured to set the second time based on the schedule and the electricity rate table.

6. The charge control system according to claim 1, further comprising:

a battery temperature prediction unit configured to predict a temperature transition of the battery; and a battery temperature adjustment control unit configured to adjust, based on the temperature transition of the battery, a temperature of the battery while the vehicle is stopped, wherein the discharge amount includes an amount of electric power consumed to adjust the temperature of the battery.

7. The charge control system according to claim 1, further comprising:

a vehicle compartment temperature adjustment control unit configured to adjust, based on a next scheduled use time, a temperature of a vehicle compartment while the vehicle is stopped, wherein the discharge amount includes an amount of electric power consumed to adjust the temperature of the vehicle compartment.

8. The charge control system according to claim 1, wherein the discharge amount acquisition unit acquires a discharge amount at a time after charge to a target SOC is performed.

9. The charge control system according to claim 1, wherein the electricity rate calculation unit predicts a time-series change in a charge output based on an SOC at a start of charge, an SOC at an end of charge, an output of the charging equipment, and a battery temperature transition prediction, and calculates the electricity rate by multiplying a charge output and a charge time by an electricity rate unit price.

10. The charge control system according to claim 1, wherein the notification unit notifies of the comparison result at a timing when it is detected that a charging unit is connected to the vehicle at a basic charging location registered in advance.

* * * * *